United States Patent Office 3,528,172
Patented Sept. 15, 1970

3,528,172
METHOD FOR THE MANUFACTURING OF COILS
Olgierd Smulkowski, Paris, France, assignor to CSF-Compagnie Generale de Telegraphie Sans Fil, a corporation of France
Filed June 17, 1964, Ser. No. 375,725
Claims priority, application France, June 15, 1964, 939,117
Int. Cl. H01f 7/06
U.S. Cl. 29—602                    3 Claims

ABSTRACT OF THE DISCLOSURE

The disclosure has for object a new method for manufacturing a coil, made of a non ductile compound, such as $Nb_3Sn$, wound around an insulating frame. In this method, the frame is covered by a thin layer of the compound. The deposit is formed by placing the frame in an oven, in which a gaseous mixture of the components of the compound is fed. Through a photoengraving method, a helical strip of the compound is then removed from the coil frame.

---

The present invention relates to the winding of coils.

The invention relates more specifically to the manufacture of windings, wherein the conductor is of a substance whose superconductive properties are highly suitable for the production of high intensity fields, for example above 100,000 gauss, but whose ductility is low and which is easily breakable e.g. NbZr alloy and especially the compound $Nb_3Sn$.

Known technics for winding such coils are rather involved and do not result in a good coil filling coefficient.

It is an object of the invention to provide a satisfactory method for manufacturing such coils.

According to the invention one layer of a superconductive material is first deposited on a coil frame in gaseous state and a continuous helicoidal strip of this material is then mechanically or chemically removed, so that the remaining material builds up one layer of winding turns. A layer of insulating material is then deposited on this winding. The same process can then be repeated to obtain further layers of winding turns with interposed insulation until the desired length of the winding is obtained. The electrical contacts between successive layers of turns are obtained by leaving adequate portions of successive conducting turn layers uncovered with the insulating material.

According to a further embodiment of the invention the coil is built up by stacking upon each other plates bearing superconductive turns on their faces.

Figure 1:
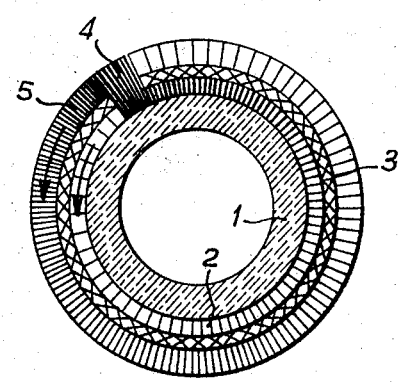
Figure 2:
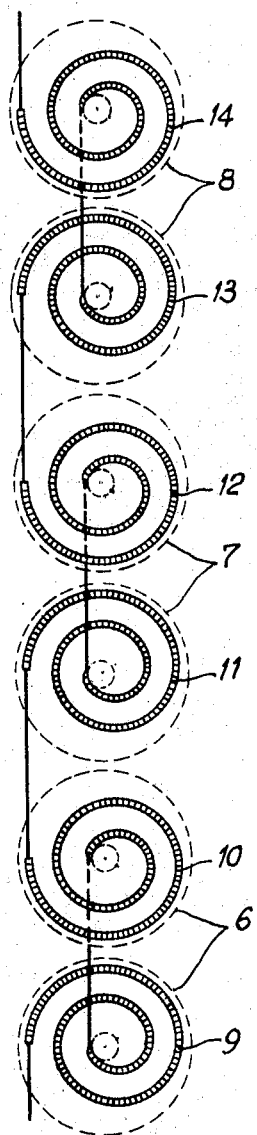

The invention will be better understood from the following description and appended drawings wherein:

FIG. 1 shows in a somewhat particular manner a cross sectional view of a coil according to the invention; and FIG. 2 is an exploded schematic view of a further embodiment of a coil according to the invention.

The coil shown in FIG. 1 is manufactured as follows:

On an isolating cylindrical coil frame, for example of a ceramic material, is formed a helical strip of superconductive material, for example of $Nb_3Sn$. This result is obtained by covering the entire surface of frame 1 with a thin layer of this compound. The deposit is formed by placing frame 1 in an oven, brought to a temperature of the order of 1050° under reducing hydrogen atmosphere. Gaseous mixture of the $NbCl_5$ and $SnCl_4$, for example, is then fed to the oven. After about two hours a coating, 0.1 mm. thick, of the above compound is obtained on a coil frame of 1 cm. in diameter and of 5 cm. long.

Through a known photoengraving method a helical strip of the compound is then removed from the coil frame so that only a helical strip 2 is left on frame 1.

Strip 2 is then covered with a uniform isolating film 3, a few microns thick, which may be for example silica. This layer can be obtained from thermal decomposition of ethyl silicate.

By means of a suitable mask, the portion of strip 2 which must be connected to strip 5, which will be formed in the same manner as strip 2, on the insulating coating 3, is left uncovered. Successive layers of superconductive turns which are separated from each other by tubular sleeves of insulating material, except where they are connected to each other, are thus formed.

FIG. 1 shows in a diagrammatical manner how two successive layers of turns 2 and 5 are connected to each other.

The hatching is made more dense to indicate one end of the coil and its density decreases from one end to the other. Connection 4 between layers 2 and 5 at one end of the coil is thus shown by a denser hatching.

In the embodiment of FIG. 2, the coil assembly comprises a stack of annular ceramic plates, such as plates 6, 7 and 8. Both sides of each plate have been shown.

Each plate is processed as follows:

A uniform coating of superconductive material is first formed on both sides of each plate. Then part of this coating is removed so as to leave a spiral shaped strip, such as strips 9 to 14, of superconductive material on each sides of plates 6 to 8.

A thin film of insulating material such as silica, is then deposited on the entire plate surface except where electrical contacts between the successive spirals are to be made. This is achieved by means of a mask.

FIG. 2 shows the connections between spirals 9 to 14. It can be seen that the connections between spirals 9 and 10, 11 and 12, 13 and 14 are made at the center of the corresponding plates, while the connections between spirals 10 and 11 and spirals 12 and 13 are made at the other end of the spirals concerned.

Of course, the invention is not limited to the embodiments described and shown which were given solely by way of example.

What is claimed is:

1. A method for manufacturing coil in a non ductile substance comprising the steps of: depositing on a coil insulating frame, a uniform coating of said substance by feeding on said frame a mixture of a reacting gas, and the mixed vapors of compounds of the constituents of said substance, such as at least a portion of said constituents of said substance are deposited on said frame to form a coating of said substance, and removing from said coating a continuous spiral strip by a photoengraving process.

2. A method for manufacturing coils in a non ductile substance comprising the steps of depositing on the side walls of a cylindrical coil insulating frame a first uniform coating of said substance; removing from said coating a continuous spiral strip; depositing an insulating coating on said first coating while leaving uncovered portions of said first coating; depositing a second uniform coating of said substance; and removing therefrom a continuous spiral by a photoengraving process, said coatings being deposited by feeding on said frame a mixture of a reacting gas, and of the mixed vapors of compounds of the constituents of said substance such as at least portions of said constituents are deposited on said frame.

3. A method for manufacturing coils in a non ductile substance comprising the steps of depositing on a plurality of disc shaped coil frame insulating members, having two faces, a uniform coating of said substance, removing from each of said faces a continuous spiral strip by a photoengraving process, depositing an insulating coating on said frame members while leaving uncovered portions of said uniform coating and stacking said members upon each other, said uniform coating of said substance being deposited by feeding on said frame a mixture of a reacting gas, and of the mixed vapors of compound of the constituents of said substance, such as at least portions of said constituents is deposited on said frame.

References Cited

UNITED STATES PATENTS

| | | |
|---|---|---|
| 838,423 | 12/1906 | Kitsee. |
| 2,584,592 | 2/1952 | Kehbel. |
| 2,911,605 | 10/1956 | Wales. |
| 3,268,362 | 8/1966 | Hanak et al. |
| 3,280,337 | 10/1966 | Newhouse et al. |
| 2,785,997 | 3/1957 | Marvin. |
| 2,900,612 | 8/1958 | Tripp _____ 336—200 |
| 2,982,889 | 5/1961 | Whearley. |
| 2,983,889 | 5/1961 | Green _____ 338—32 |
| 3,080,541 | 3/1963 | Parker _____ 336—200 |
| 3,085,899 | 4/1963 | Forman _____ 29—155.56 |
| 3,110,087 | 11/1963 | Raschman _____ 29—155 |
| 3,281,738 | 10/1966 | Hanak _____ 335—216 |
| 3,258,828 | 7/1966 | Swartz _____ 29—155 |
| 3,056,889 | 10/1962 | Nyberg _____ 307—88.5 |
| 2,506,604 | 5/1950 | Lokker et al. _____ 204—15 |
| 3,247,476 | 4/1966 | Pintell _____ 336—206 XR |

JOHN F. CAMPBELL, Primary Examiner

R. W. CHURCH, Assistant Examiner

U.S. Cl. X.R.

29—599; 117—8, 217, 227; 204—15